Sept. 15, 1953
K. H. KLINE
2,651,940
APPARATUS FOR MEASURING LIQUID LEVEL
Filed Aug. 10, 1950
2 Sheets-Sheet 1
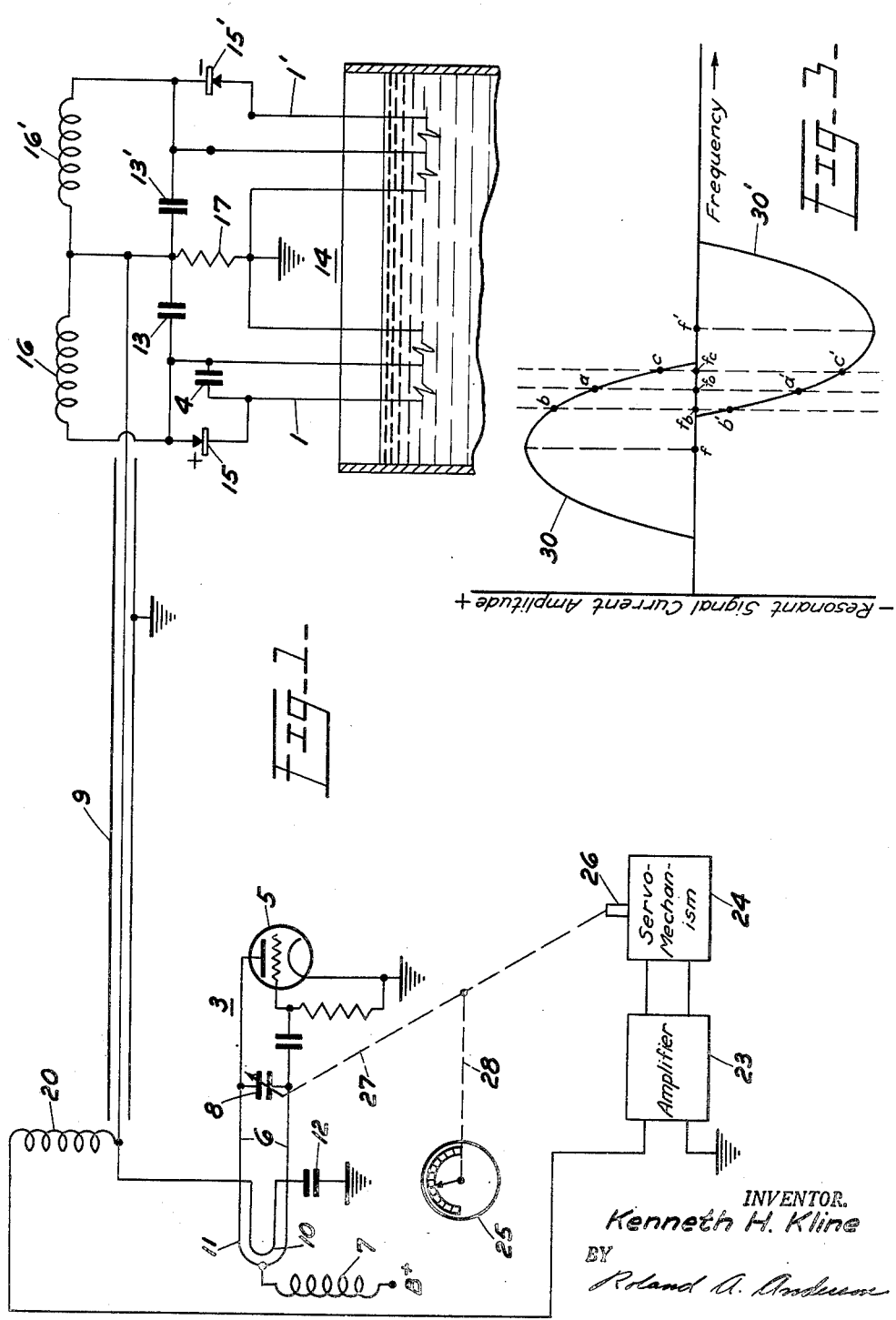
INVENTOR.
Kenneth H. Kline
BY
Roland A. Anderson
ATTORNEY

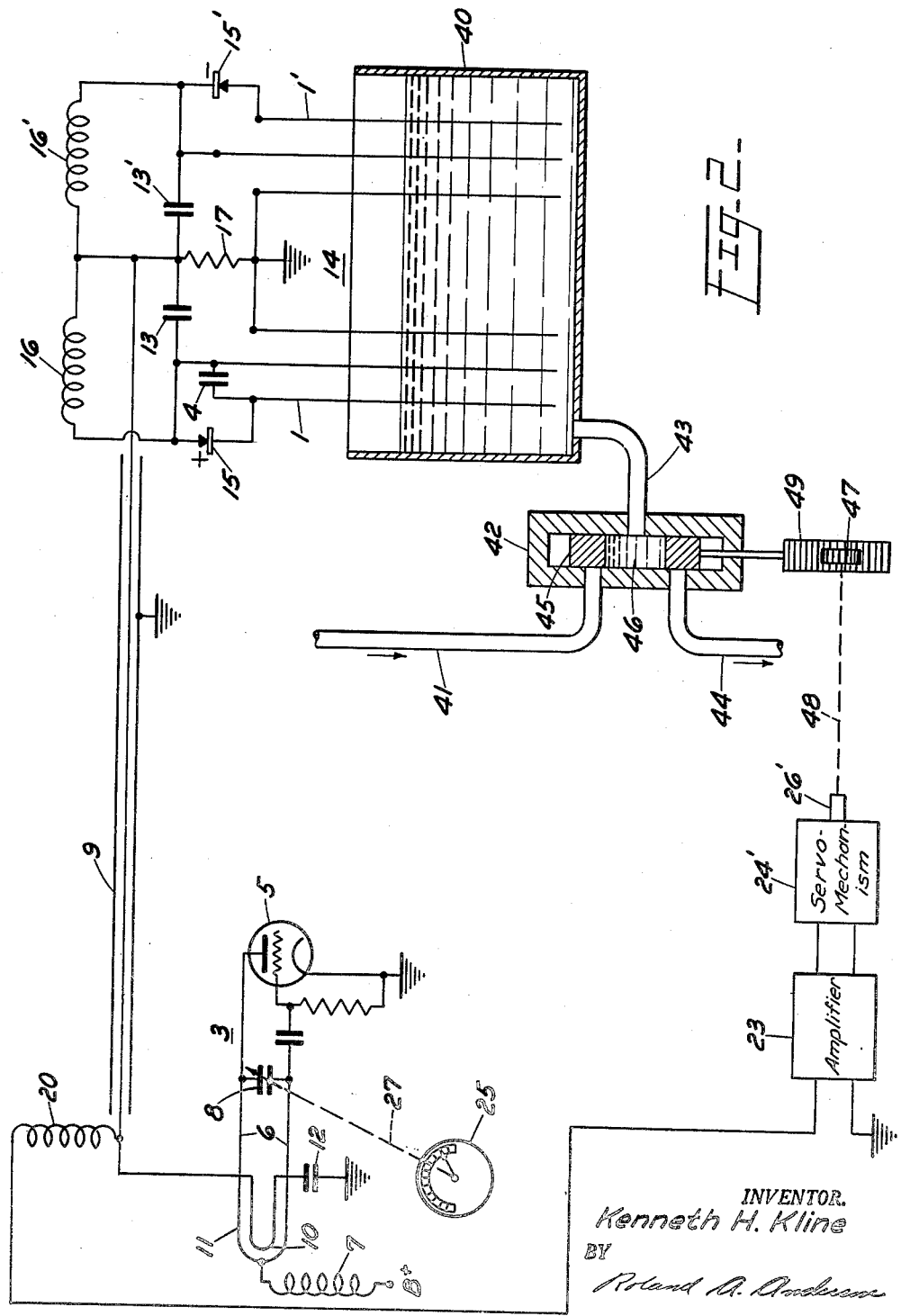

Patented Sept. 15, 1953

2,651,940

UNITED STATES PATENT OFFICE 2,651,940

APPARATUS FOR MEASURING LIQUID LEVEL

Kenneth H. Kline, Oak Ridge, Tenn., assignor to the United States of America as represented by the United States Atomic Energy Commission Application August 10, 1950, Serial No. 178,696

9 Claims. (Cl. 73—304)

This invention relates to apparatus for measuring, indicating and/or controlling the liquid level of a body of liquid disposed in an inaccessible location.

The problem of measuring the level of a liquid disposed in an inaccessible location is one which frequently arises in the laboratories and in industry, and many liquid level measuring devices operating on diverse principles have been employed in the past. None of these prior art devices, however, have been altogether satisfactory in respect to simplicity, accuracy, and reliability. In particular, the prior art devices have all been characterized by the presence of mechanically moving parts, such as floats of one kind or another, which have a tendency to get out of order, and which are difficult to repair when the measuring device is disposed in an inaccessible location.

Accordingly, it is the general object of the present invention to provide extremely simple, accurate, and reliable liquid level measuring or sensing apparatus.

It is another object of the present invention to provide liquid level measuring apparatus which is characterized by the complete absence of moving parts and accordingly is extremely reliable in operation.

Still another object of the present invention is to provide automatic liquid level control apparatus operating in response to the aforesaid liquid level measuring or sensing apparatus.

Other objects and advantages of the present invention will become apparent from the following specification and the accompanying drawings wherein, Figure 1 is a schematic drawing and wiring diagram of apparatus illustrating the principles of the present invention as applied particularly to the measurement and remote indication of liquid level.

Figure 2 is a schematic drawing and wiring diagram of a device illustrating the principles of the present invention as applied particularly to the measurement and the automatic remote control of liquid level, and Figure 3 is a graph showing the relationship between the resonant signal current amplitude and frequency for the electrical resonant sensing element, which graph is helpful in understanding the principles of operation of the invention.

According to the principles of the present invention, the basic liquid level sensing or measuring element comprises an electrical resonant circuit of one kind or another which is adapted to support a standing wave pattern of electromagnetic oscillations. This resonant circuit is partially immersed in the liquid, the level of which is to be measured, such that the liquid itself forms an electrical component of the circuit. Accordingly, the resonant frequency of the circuit is dependent upon the liquid level, and it can therefore be said that the liquid level defines a particular reference frequency which varies with the liquid level.

The frequency thus defined by the liquid level may be detected and employed as a measure of the liquid level. In practicing his invention, applicant prefers to employ two such electrical resonant circuits having different resonant frequencies and so interconnected that the liquid level can be thought of as defining a particular reference frequency which is the arithmetic mean of the resonant frequencies of the two circuits. A high frequency signal of known frequency is generated and applied to each of the two resonant circuits, and a discriminator circuit, employing two oppositely connected rectifiers, is connected to the two resonant circuits so as to produce an output error signal which corresponds in sense and magnitude to the difference between the applied high frequency signal and the mean resonant frequency of the two resonant circuits.

In the form of the invention shown in Figure 1, this error signal is employed through a suitable servo-mechanism to maintain the frequency of the applied high frequency signal exactly equal to the mean resonant frequency defined by the liquid level. In this way, the frequency of the applied high frequency signal is a measure of the liquid level, and it may be used to provide an indication of the actual value of liquid level by means of a suitably calibrated visual indicator.

In the embodiment of the invention shown in Figure 2, the derived error signal is employed through a suitable servo-mechanism to operate a control valve associated with the liquid container, which valve controls the liquid level so as to maintain the mean resonant frequency defined thereby at all times equal to the applied high frequency signal. In this way, the liquid level will be automatically maintained at any desired value, and this value may be varied by manual control of the frequency of the applied high frequency signal.

Referring now to Figure 1, the pair of electrical resonant circuits is illustrated as a pair of resonant coaxial lines 1 and 1' extending downwardly into the liquid, the level of which is to be measured, so as to be partially immersed in such liquid. It will be apparent that a two conductor parallel line or even a cavity resonator could be substituted for each coaxial line, if desired. It will be understood that coaxial lines 1 and 1' are adapted, when so immersed, to resonate at resonant frequencies which differ from each other by a certain amount, for example, by one megacycle. This could be accomplished in various ways, such as by providing resonant lines which differ slightly in geometry. Applicant prefers, however, to employ identical coaxial lines 1 and 1' immersed to equal depths in the liquid, and to obtain the resonant frequency difference by connecting a condenser 4 across one of the coaxial lines (line 1) so as to increase the effective electrical length of this line and thus lower its resonant frequency. Since the liquid itself forms an integral electrical component of the resonant lines, it will be apparent that the respective resonant frequencies of the lines will vary with the liquid level. As will hereinafter be explained, the liquid level can be thought of as defining a reference frequency which is the arithmetic mean between the respective resonant frequencies of the two lines 1 and 1'.

A radio frequency generator 3, which may be of any conventional type, is provided for generating a high frequency signal to be applied to lines 1 and 1'. Generator 3 is illustrated as a conventional parallel line vacuum tube oscillator, having vacuum tube 5, parallel lines 6, blocking coil 7, and a movable tuning element in the form of a variable condenser 8.

The high frequency signal produced by generator 3 is coupled to a coaxial transmission line 9 by a loop 10 which is placed in proximity to a loop 11 formed at the interconnection of parallel lines 6. One terminal of loop 10 is connected to ground through blocking condenser 12 and its other terminal is connected to the inner conductor of coaxial line 9. The outer conductors of each of coaxial lines 1, 1', and 9 are all grounded, as shown.

A frequency discriminator circuit, indicated generally at 14, forms the interconnection between the transmission line 9 and resonant lines 1 and 1'. Circuit 14 corresponds generally in its circuit elements and in its operation to frequency discriminator circuits commonly employed in automatic frequency control systems and as detectors in frequency modulation systems. As shown, the circuit comprises a pair of blocking condensers 13 and 13' connected between the inner conductor of line 9 and the respective inner conductors of lines 1 and 1'. Connected directly across lines 1 and 1', respectively, is a pair of unidirectional current devices, or rectifiers, 15 and 15', respectively. These rectifiers are connected in oppositely conducting relationship so that the resonant signal current from line 1 flows through rectifier 15 in one direction every other half cycle, and the resonant signal current from line 1' flows through rectifier 15' in an opposite direction on the alternate half cycles. Choke coils 16 and 16' are connected between the inner conductor of line 9 and the respective inner conductors of lines 1 and 1'. A matching impedance 17 is provided across line 9.

By virtue of their opposite polarity connections, rectifiers 15 and 15' operate to compare the magnitude of the resonant signal currents of lines 1 and 1', and to produce across line 9 a D. C. voltage signal corresponding in magnitude and polarity to the magnitude and sign of the difference between these resonant signal currents. As will be more fully explained hereinafter with reference to Fig. 3, this D. C. voltage signal thus constitutes an error signal which corresponds in magnitude and polarity to the magnitude and sign of the difference between the frequency generated by generator 3 and the arithmetic mean of the respective resonant frequencies of lines 1 and 1'.

The thus derived D. C. error signal is connected by way of choke coil 20 to the input of a servo-mechanism 24, which servo-mechanism may be preceded by the usual servo-amplifier 23. Servo-mechanism 24 may be any of the well known types of devices adapted to produce a rotation of its output shaft 26 at a velocity and in a direction corresponding to the magnitude and polarity of the error signal applied to its input.

As schematically indicated at 27, output shaft 26 of the servo-mechanism is mechanically tied to the movable element of variable condenser 8, so that the frequency of generator 3 is varied in response to rotation of shaft 26. The response of the servo-mechanism is always in such a direction as to move the generated frequency in the direction toward coincidence with the mean resonant frequency of lines 1 and 1', and thus tend to reduce to zero the error signal. In this way, the servo-mechanism operates to maintain the generated frequency exactly equal to the mean resonant frequency of lines 1 and 1' (under which equilibrium conditions the error signal is zero). Since the mean resonant frequency is a function of the liquid level, the position of the movable element of variable condenser 8 is therefore also a function of the liquid level. As schematically indicated at 28, the movable element of variable condenser 8 is mechanically tied to the movable pointer of an indicator 25, the dial of which may be calibrated in terms of liquid level.

Referring now to Fig. 3, wherein the resonant signal current amplitude is plotted against frequency for the resonant lines 1 and 1', $f$ and $f'$ represent the resonant frequencies of lines 1 and 1', respectively, at some particular liquid level. Solid curves 30 and 30' are corresponding plots of the resonant signal current amplitude versus frequency for the two lines 1 and 1', respectively. Curves 30 and 30' are plotted on opposite sides of the horizontal axis since, as previously brought out, the resonant signal currents are caused to contribute oppositely to the D. C. error signal as a result of the opposed conducting relationship of rectifiers 15 and 15'. It will be apparent that the two curves 30 and 30' may be considered as defining a reference frequency $f_0$, midway between the resonant frequencies $f$ and $f'$, at which the resonant signal current amplitudes $a$ and $a'$ are exactly equal. Whenever the applied frequency originating at generator 3 is exactly equal to this mean resonant frequency $f_0$, the resonant signal currents exactly cancel each other out, the derived error signal is zero, and equilibrium conditions obtain. However, if the applied frequency is at a value $f_b$, lower than the mean resonant frequency $f_0$, then a positive polarity error signal is produced which is equal in magnitude to the difference between the respective resonant signal amplitude $b$ and $b'$. Similarly, if the applied frequency is at a value $f_c$, higher than the mean resonant frequency $f_0$, then a negative polarity error signal is produced equal in magnitude to the difference between the respective resonant signal current amplitudes $c$ and $c'$. Thus, the D. C. error signal at all times corresponds in magnitude and polarity to the difference between the frequency applied to lines 1 and 1' and their mean resonant frequency.

It will be appreciated that curves 30 and 30' have reference to a single particular liquid level. The effect of a change in liquid level is to shift the resonant frequencies $f$ and $f'$ equally in a direction dependent upon the direction of the change in liquid level. As the resonant frequencies $f$ and $f'$ shift, the associated curves 30 and 30', and the mean resonant frequency $f_0$, of course, also shift correspondingly.

It will be noted from Figure 3 that in order for the apparatus to operate as described, the curves 30 and 30' must overlap one another. Otherwise, a zero error signal would be obtained whenever the applied frequency lay anywhere in the range between the right end of curve 30 and the left end of curve 30', instead of only when the applied frequency was exactly equal to the mean resonant frequency of the lines 1 and 1'. Accordingly, the difference between the resonant frequencies of lines 1 and 1' should not be too great if high accuracy in operation is desired. Applicant has found that a difference of resonant frequencies of lines 1 and 1' of about one megacycle, resonator 1 having a resonant frequency of about 99.5 megacycles and resonator 1' having a resonant frequency of about 100.5 megacycles, has given excellent results.

Figure 2 represents a modification of the apparatus of Figure 1 in which the servo-mechanism is employed to automatically maintain the liquid level at any desired value. In Figure 2, there is shown a tank 40 containing the liquid the level of which is to be controlled. Additional liquid may be introduced into tank 40 from a source of such liquid by way of conduit 41, valve 42, and conduit 43. Liquid may be withdrawn from tank 40 by way of conduit 43, valve 42 and discharge conduit 44. Valve 42 has a movable control element 45 which controls the introduction and withdrawal of liquid from tank 40. The control element 45 is shown in it closed position wherein liquid can neither be introduced into or withdrawn from the tank. As element 45 is raised from its closed position, a progressively increasing rate of flow of liquid into tank 40 is permitted via the port 46 formed in element 45. Similarly, as element 45 is lowered from its closed position, a progressively increasing rate of withdrawal of liquid from tank 1 is permitted.

The remainder of the apparatus of Figure 2 is identical, as to equipment and operation, to that of Figure 1 with the exception of the servo-mechanism 24' and the equipment it drives. In the case of Figure 2, the output shaft 26' of servo-mechanism 24' is connected to a pinion 47, as schematically illustrated at 48. Pinion 47 drives rack 49 which is mechanically connected to control the position of the control element 45 of valve 42. In this case, servo-mechanism 24' is preferably of the well known "displacement" type which is adapted to produce an angular displacement of output shaft 26' which corresponds in magnitude and direction to the magnitude and polarity of the input signal. As is well known, the "velocity" type servo-mechanism employed in Figure 1 may readily be converted to a "displacement" type servo-mechanism by the simple addition of another closed loop whereby a signal corresponding to the displacement of the servo output is subtracted from the input signal prior to the application of such input signal to the servo-motor. Under equilibrium conditions (zero error signal), control element 46 is in its closed position, as shown. Under non-equilibrium conditions control element 46 is displaced from its closed position by an amount and in a direction corresponding to the magnitude and polarity of the D. C. error signal applied to the input of servo-mechanism 24'.

In the operation of the apparatus of Figure 2, the variable condenser 8 is manually adjusted to the frequency corresponding to some desired liquid level as indicated on indicator 25. If the liquid level is not at the desired value, the mean resonant frequency of lines 1 and 1' will differ from the generated frequency applied to these lines, and an error signal corresponding to such difference will be produced by frequency discriminator circuit 14 in the same manner as was previously described. The error signal will thus correspond in magnitude and polarity to the magnitude and sign of the difference between the actual liquid level and the desired liquid level. The effect of this error signal will be to correspondingly displace the control element 45 of valve 46 in a direction such as to tend to bring the liquid level to its desired value and thus to reduce the error signal; that is, if the liquid level is less than the desired value, control element 45 is raised introducing more liquid into tank 40, and if the liquid level is greater than the desired value, control element 45 is lowered permitting the discharge of liquid from the tank. This action will continue until the liquid level attains the desired level corresponding to the setting of variable condenser 8, at which time the error signal will have been reduced to zero and the control element will have been returned to its closed position.

It, of course, is basic to the operation of the present invention that the resonant frequencies of lines 1 and 1' be dependent upon the level of the liquid in which they are immersed. While this is true irrespective of the conductivity of the liquid in question, it should be brought out that the mechanism of such dependency does depend upon the conductivity of the liquid. For example, if the conductivity of the solution is relatively high (above about $1 \times 10^{-4}$ mhos/cm.) the liquid operates as a short circuit termination of the line at or near the surface of the liquid. Under these conditions, the liquid level, in effect, controls the actual length of the line and thus controls its resonant frequency. However, if the conductivity of the liquid is insufficient for it to operate as a short circuit termination of the line, then variation of resonant frequency with liquid level is dependent upon the fact that, as the liquid level rises, for example, some of the air between inner and outer conductors is being replaced by a material of a different dielectric constant, that is, by the rising liquid. It will be apparent that under the latter conditions, the resonant frequency of the line will be sensitive not only to variations in the liquid level but also to variations in the dielectric constant of the liquid.

Since many changes could be made in the above construction and many apparently widely different embodiments of this invention could be made without departing from the principles thereof, it is intended that all matter contained in the above description, or shown in the accompanying drawings, shall be interpreted as illustrative and not in a limiting sense.

What is claimed is:

1. In apparatus for measuring the level of liquid in a container, in combination, means forming a pair of high frequency resonant circuits having different resonant frequencies, said circuits both being partially immersed in said liquid, whereby the resonant frequency of each of said circuits is dependent on the liquid level, means for generating a high frequency electrical signal, means for applying said signal to both of said circuits, and frequency discriminator means connected to said circuits for deriving an error signal corresponding to the difference between the frequency of said high frequency signal and the mean resonant frequency of said circuits.

2. In apparatus for measuring the level of liquid in a container, in combination, means forming a pair of high frequency resonant circuits having different resonant frequencies, said circuits both being partially immersed in said liquid, whereby the resonant frequency of each of said circuits is dependent on the liquid level, means for generating a high frequency electrical signal, means for applying said signal to both of said circuits, frequency discriminator means connected to said circuits for deriving an error signal corresponding to the difference between the frequency of said high frequency signal and the mean resonant frequency of said circuits, and means responsive to said error signal for varying the frequency of operation of said generating means.

3. In apparatus for measuring the level of liquid in a container, in combination, means forming a pair of high frequency resonant circuits having different resonant frequencies, said means being partially immersed in said liquid, whereby the resonant frequency of each of said circuits is dependent on the liquid level, means for generating a high frequency electrical signal, means for applying said signal to both of said circuits, frequency discriminator means connected to said circuits for deriving an error signal corresponding to the difference between the frequency of said high frequency signal and the mean resonant frequency of said circuits, movable means for varying the frequency of operation of said generating means, a servo-mechanism having an electrical input and a mechanical output, means for applying said error signal to the input of said servo-mechanism, and means forming a mechanical connection between the output of said servo-mechanism and said movable means.

4. In apparatus for measuring the level of liquid in a container, in combination, means forming a pair of high frequency resonant circuits having different resonant frequencies, said means being partially immersed in said liquid, whereby the resonant frequency of each of said circuits is dependent on the liquid level, means for generating a high frequency electrical signal, means for applying said signal to both of said circuits, frequency discriminator means connected to said circuits for deriving an error signal corresponding to the difference between the frequency of said high frequency signal and the mean resonant frequency of said circuits, movable means for varying the frequency of operation of said generating means, a servo-mechanism having an electrical input and a mechanical output, means for applying said error signal to the input of said servo-mechanism, means forming a mechanical connection between the output of said servo-mechanism and said movable means, and visual indicator means mechanically connected to said movable means.

5. In apparatus for controlling the level of liquid in a container, in combination, means forming a pair of high frequency resonant circuits having different resonant frequencies, said circuits both being partially immersed in said liquid, whereby the resonant frequency of each of said circuits is dependent on the liquid level, means for generating a high frequency electrical signal, means for applying said signal to both of said circuits, frequency discriminator means connected to said circuits for deriving an error signal corresponding to the difference between the frequency of said high frrequency signal and the mean resonant frequency of said circuits, and manually adjustable means for controlling the frequency of operation of said generating means.

6. In apparatus for controlling the level of liquid in a container, in combination, means forming a pair of high frequency resonant circuits having different resonant frequencies, said circuits both being partially immersed in said liquid, whereby the resonant frequency of each of said circuits is dependent on the liquid level, means for generating a high frequency electrical signal, means for applying said signal to both of said circuits, frequency discriminator means connected to said circuits for deriving an error signal corresponding to the difference between the frequency of said high frequency signal and the mean resonant frequency of said circuits, manually controllable means for varying the frequency of operation of said generating means, and visual indicator means mechanically connected to said manually controllable means.

7. In apparatus for measuring the level of liquid in a container, in combination, means forming a pair of high frequency resonant circuits having different resonant frequencies, said circuits both being partially immersed in said liquid, whereby the resonant frequency of each of said circuits is dependent on the liquid level, means for generating an electrical signal having a frequency equal to the mean resonant frequency of said circuits, means for applying said signal to both of said circuits, and means connected to said circuits for deriving an error signal corresponding to the difference between the amplitudes of the high frequency currents in said respective circuits.

8. In apparatus for measuring the level of liquid in a container, in combination, means forming a pair of high frequency resonant circuits having different resonant frequencies, said circuits both being partially immersed in said liquid, whereby the resonant frequency of each of said circuits is dependent on the liquid level, means for generating an electrical signal having a frequency equal to the mean resonant frequency of said circuits, means for applying said signal to both of said circuits, means connected to said circuits for deriving an error signal corresponding to the difference between the amplitudes of the high frequency currents in said respective circuits, and means responsive to said error signal for varying the frequency of operation of said generating means in a direction tending to reduce said error signal to zero.

9. Apparatus, as claimed in claim 1, wherein said partially immersed resonant circuits comprise high frequency transmission lines extending downwardly into the liquid.

KENNETH H. KLINE.

References Cited in the file of this patent

UNITED STATES PATENTS

| Number | Name | Date |
|---|---|---|
| 2,200,863 | Schuck | May 14, 1940 |
| 2,310,298 | Kuhl | Feb. 9, 1943 |
| 2,323,128 | Hare | June 29, 1943 |
| 2,523,363 | Gehman | Sept. 26, 1950 |